United States Patent
Faher

(10) Patent No.: US 10,402,583 B2
(45) Date of Patent: Sep. 3, 2019

(54) METHOD OF PRIVACY PRESERVING DURING AN ACCESS TO A RESTRICTED SERVICE

(71) Applicant: GEMALTO SA, Meudon (FR)

(72) Inventor: Mourad Faher, Meudon (FR)

(73) Assignee: GEMALTO SA, Meudon (FR)

( * ) Notice: Subject to any disclaimer, the term of this patent is extended or adjusted under 35 U.S.C. 154(b) by 33 days.

(21) Appl. No.: 14/903,036

(22) PCT Filed: Jul. 4, 2014

(86) PCT No.: PCT/EP2014/064375
§ 371 (c)(1),
(2) Date: Jan. 5, 2016

(87) PCT Pub. No.: WO2015/001109
PCT Pub. Date: Jan. 8, 2015

(65) Prior Publication Data
US 2016/0171240 A1    Jun. 16, 2016

(30) Foreign Application Priority Data
Jul. 5, 2013    (EP) .................... 13305960

(51) Int. Cl.
*G06F 21/62* (2013.01)
*H04L 29/06* (2006.01)
(Continued)

(52) U.S. Cl.
CPC ....... *G06F 21/6245* (2013.01); *G06Q 20/409* (2013.01); *G07F 7/0846* (2013.01);
(Continued)

(58) Field of Classification Search
CPC .. G06F 21/6245; G06F 7/0846; G06F 7/1008; G06Q 20/409; G09C 5/00;
(Continued)

(56) References Cited

U.S. PATENT DOCUMENTS

| | | | |
|---|---|---|---|
| 7,366,918 B2 * | 4/2008 | Barlow | G06Q 20/105 257/679 |
| 7,734,280 B2 * | 6/2010 | Eastlake, III | H04L 63/08 380/247 |

(Continued)

OTHER PUBLICATIONS

Martin Goldack: "Lesson learned: From MS Passport to CardSpace", Jul. 9, 2006, XP055033966, Retrieved from the Internet: URL:http://nds.hgi.rub.de/lehre/seminar/SS06/Goldack_PassportCardSpace.pdf [retrieved on Jul. 26, 2012] abstract, 3.3 Protocol, figure 3.

(Continued)

*Primary Examiner* — Catherine Thiaw
(74) *Attorney, Agent, or Firm* — The Jansson Firm; Pehr B. Jansson

(57) ABSTRACT

The present invention relates to a method of privacy-preserving during an access to a restricted e-service requiring user private data from a smart card. The invention relates more particularly to the field of methods implemented so that the user has the guarantee that only the private data needed to access to the e-service are extracted from the smart card. It is to guarantee that the user has a perfect knowledge of his private data provided by his smart card to a requester. With the invention a message notifying to the user the very nature of the identity assertion is displayed on the screen of the smart card. By doing so, the card ensure 100% security with regard to user consent: the data read out of his card cannot differ comparing to the data requested by the service provider through the terminal.

24 Claims, 2 Drawing Sheets

(51) Int. Cl.
  *G09C 5/00* (2006.01)
  *G07F 7/10* (2006.01)
  *H04L 9/32* (2006.01)
  *G06Q 20/40* (2012.01)
  *G07F 7/08* (2006.01)
  *H04L 9/08* (2006.01)

(52) U.S. Cl.
  CPC ............. *G07F 7/1008* (2013.01); *G09C 5/00* (2013.01); *H04L 9/3234* (2013.01); *H04L 63/0421* (2013.01); *H04L 63/08* (2013.01); *H04L 63/0815* (2013.01); *H04L 63/20* (2013.01); *H04L 9/0877* (2013.01); *H04L 9/32* (2013.01); *H04L 63/10* (2013.01)

(58) Field of Classification Search
  CPC ... H04L 9/3234; H04L 63/0421; H04L 63/08; H04L 63/0815; H04L 63/20; H04L 9/0877; H04L 9/32
  See application file for complete search history.

(56) References Cited

U.S. PATENT DOCUMENTS

| | | | | |
|---|---|---|---|---|
| 8,190,127 B2 * | 5/2012 | Cofta | ............... | G06F 21/445 379/142.05 |
| 8,855,312 B1 * | 10/2014 | Hodgman | ............... | G06F 21/44 380/270 |
| 9,589,242 B2 * | 3/2017 | Robinson | ............... | G06Q 10/06 |
| 2001/0054148 A1 * | 12/2001 | Hoornaert | ............... | E21B 41/0042 713/172 |
| 2006/0087999 A1 * | 4/2006 | Gustave | ............... | H04L 63/0853 370/328 |
| 2007/0143835 A1 | 6/2007 | Cameron et al. | | |
| 2008/0184339 A1 * | 7/2008 | Shewchuk | ............... | G06F 21/33 726/3 |
| 2009/0300747 A1 * | 12/2009 | Ahn | ............... | G06F 21/34 726/9 |
| 2010/0058435 A1 * | 3/2010 | Buss | ............... | G06F 15/16 726/1 |
| 2010/0251353 A1 * | 9/2010 | Hodgkinson | ............... | G06F 21/34 726/9 |
| 2012/0168500 A1 | 7/2012 | Li | | |
| 2013/0086629 A1 * | 4/2013 | Kavantzas | ............... | G06F 21/33 726/1 |
| 2014/0189775 A1 * | 7/2014 | Burch | ............... | G06F 21/00 726/1 |

OTHER PUBLICATIONS

PCT/EP2014/064375 International Search Report, dated Aug. 7, 2014, European Patent Office, P.B. 5818 Patentlaan 2 NL—2280 HV Rijswijk.

PCT/EP2014/064375 Written Opinion of the International Searching Authority, dated Aug. 7, 2014, European Patent Office, P.B. 5818 Patentlaan 2 NL—2280 HV Rijswijk—Pays Bas.

* cited by examiner

METHOD OF PRIVACY PRESERVING DURING AN ACCESS TO A RESTRICTED SERVICE

TECHNICAL FIELD

The present invention generally relates to a method of privacy-preserving during an access to a restricted e-service requiring user private data from a smart card. The invention relates more particularly to the field of methods implemented so that the user has the guarantee that only the private data needed to access to the e-service are extracted from the smart card. It is to guarantee that the user has a perfect knowledge of his private data provided by his smart card to a requester.

BACKGROUND ART

There are well known specifications which define relationships between a proving party (typically a user), an identity provider (aka IdP), and a service provider (aka SP) wherein the proving party requests to access to a restricted service from the service provider. The service provider requests and obtains an identity assertion from a security token of the proving party. The identity assertion is derived from the information stored in the security token according to a policy access of the desired service provided by the service provider. The identity assertion comprises statements of the proving party which allowing to prove that the proving party fulfills the requirements of the policy access for the desired service—such as a user name, the birth date, the user address. . . .

On the basis of this assertion, the service provider can make an access control decision—in other words it can decide whether to authorize access to the service for the connected proving party.

One major problem is to ensure that the statements of the identity assertion comprise only information needed to access to the requested service. User consent is of uttermost importance to ensure that only statements necessary to access to the service are disclosed to the service provider, this is to prevent user profiling and/or traceability.

But in order to achieve such selective disclosure it is known cryptographic solutions such as U-Prove. U-Prove is a Blind signature cryptography technology. Another known cryptographic solution is identity mixer with group signature cryptography.

The protection mechanism utilized by these solutions relies on a Graphical User Interface (GUI) of a terminal through which the proving party interacts with the service provider. This GUI makes the protected data vulnerable to attack by a thief having sufficient hardware/software know-how, diagnostic equipment, and hacking abilities. Indeed, the GUI as intermediary for communication with the user does not prevent misleading or deceiving the user because obviously any GUI may be subject to attacks bearing on browser's or embedded script security beaches.

Furthermore, nowadays, the user has few or no means to check whether the requirements of the policy access are tampered with before to be delivered on his security token. Even if a secure messaging is established between the security token and the service provider, the content of the policy access are fundamentally still exposed to the risk of being modified by the service provider who sends it to the user. Secure messaging ensures integrity and confidentiality of the payload but does not prevent from changing the payload before encrypting it and delivering it to user's security token. Therefore, the user has no means to check whether the content of the identity assertion transmitted to the service provider corresponds exactly to the user data needed to access to the service.

There is thus a general need in the art for a method overcoming at least the aforementioned shortcomings. A particular need exists in the art to make sure that the user can check the statements of the identity assertion before delivering his consent to its transmission to the service provider.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The present invention addresses the aforementioned drawbacks. The present invention relates to a system and method for enabling to check the statements of the identity assertion to be created before its transmission to the service provider.

With embodiments of the present invention, the user is equipped with a device comprising a smart card and embedding on its body a display screen and keystrokes. The smart card stores user sensitive data provided by a trusted third party (Identity Provider). These user sensitive data or credentials on-demand are preferably unitary i.e. kind of pseudo-certificate bearing on a unique user attribute (e.g. user's age range, user's community group, user's postal code);

When the user through a terminal would like to access to an online service from the service provider, a control access step is enabled. During this transaction with the service provider, the communication channel can be secured according mERA protocol or any other privacy enabling protocol like mEAC (ref. EN 14890-1).

The service provider exposes on the GUI of the terminal the list of criteria along with their respective applicable condition required for the access to the service selected by the user. The user can be prompted to tick in (for acceptance) the statements to be extracted from the smart card. The user may select the criteria that seem appropriate to access to the service (for example: age range required to be enclosed in [18-30] years-old to access a service with age restriction).

The service provider addresses a request to the card. Said request comprises a command to get an identity assertion derived from the criteria selected by the user. The card identifies the criteria targeted in the command and sends to the electronic display of the device a message notifying to the user the very nature of the identity assertion.

By doing so, the card ensures 100% security with regard to user consent: the data read out of his card cannot differ comparing to the data requested by the service provider through the terminal.

The user can be prompted through the electronic display to validate the identity assertion by clicking on "OK" button of the keystroke. The user can click on a (resistive or capacitive) "OK" button embedded on-board his device thereby allowing the card application to deliver the information sought for by the service provider.

With embodiments of the present invention, there is provided a method wherein the content of the request to create statements of the identity assertion is displayed on a screen of the security token. This request comprises requirements of the policy access. The user can easily compare the content of the request to the requirements needed to access to the requested service. In case of a positive comparison, the user can validate the transaction by approving the creation and the transmission of the identity assertion to the service provider.

Therefore, with the present invention, the user can trust the environment (middleware) and the cryptographic technologies.

The result of such method allows the user to check whether the content of the policy access is tampered with before for example to be sent on his smartcard.

The method of the present invention has many technological advantages, among them: simplicity, content control, ergonomic design and full independence from the cryptographic technologies performed by devices.

Aspects of the embodiments of the present invention relate in general to a method for creating an identity assertion of a proving party when an access to a restricted service is requested by the proving party from a service provider, said identity assertion comprising statements asserting the identity of the proving party, wherein during said creation step,
  receiving from the service provider a request for creating said identity assertion, said request comprising a command to read user statements corresponding to a first policy to access to the restricted service,
  subjecting the transmission of the identity assertion to a visual control of the statements through a display of a security token of the proving party.

Aspects of the embodiments of the present invention relate to a method for creating an identity assertion of a proving party by a security token device wherein
  the proving party requests an access to a restricted service of a service provider through a terminal connected to the service provider,
  said service provider sends to the security token device through the terminal: a first policy to access to the restricted service, a request to create the identity assertion with statements about attributes of the proving party matching the first policy,
  the security token derivates the identity assertion from user information stored into the security token and the first policy,
  transmitting the identity assertion to the service provider from the security token device through the terminal or allowed the service provider to read it from the security token device via the terminal.

In other various methods, when an access request to the restricted service is received from the proven party, the service provider sends to the terminal a second policy to access to said restricted service,
  when the service provider receives a validation of the second policy by the proven party through the terminal, said service provider sends to the security token device through the terminal; the first policy to access to the restricted service and the a request to create the identity assertion,
  if the comparison of the first policy received through the security token device to the second policy received through the terminal is successful, the security token device derivates the identity assertion,
  The result of such embodiment allows the user to check whether the criteria to access to the service have been amended before to be sent on his smartcard.

In other various methods, the creation of the identity assertion comprises the following steps,
  displaying the identity assertion to a screen of the security token device,
  when the statements of the identity assertion is approved by the proving party from the security token keyboard, transmitting the identity assertion to the service provider or allowed the service provider to read it from the security token device.

The result of such embodiment allows the user to check whether the content of the identity assertion matches the criteria to access to the requested service.

In other various methods, the deriving step of the identity assertion can be performed by a third party which can be an identity provider.

In other various methods, the service provider grants an access to the requested service for the connected proving party if the received identity assertion matches the requirement access to said service.

In other various methods, before the creation of the identity assertion step, an authentication of the proving party can be performed through the security token. The communication channel between the service provider and the proving party terminal can be secured.

The present invention also relates to a system comprising a proving party terminal configured to communicate with a service provider to access to a restricted service, wherein the creation and/or the transmission of the identity assertion is subjected to a visual control of statements of said identity assertion through a display of a security token of the proving party according to any previous claims.

BRIEF DESCRIPTION OF THE DRAWINGS

The following detailed description will be better understood with the drawings, in which.

DETAILED DESCRIPTION OF THE EMBODIMENTS OF THE INVENTION

Figure 1:
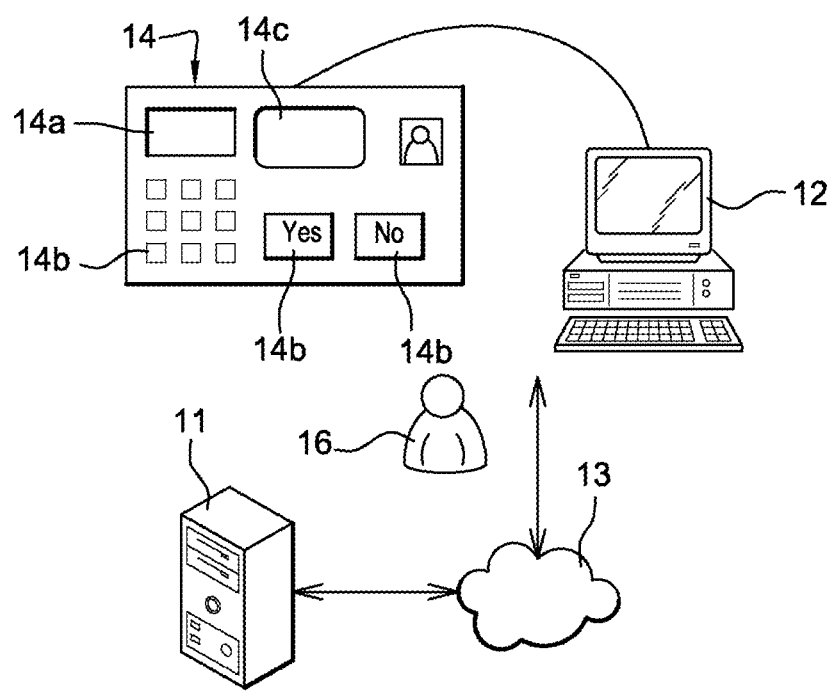
FIG. 1 represents a block diagram illustrating the participants in the processes described in FIG. 2.

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

The same elements have been designated with the same referenced numerals in the different drawings. For clarity purposes, only those elements and steps which are useful to the understanding of the present invention have been shown in the drawings and will be described.

Further, the mechanisms of data communication between the parties and their environment have not been detailed either, the present invention being here again compatible with usual mechanisms.

Moreover, the connecting lines shown in the various figures contained herein are intended to represent exemplary functional relationships and/or physical couplings between the various elements. It should be noted that many alternatives or additional functional relationships or physical connections may be present in a practical system. Furthermore, the user terminal and the service provider illustrated in FIG. 1 may communicate via any suitable communication medium (including the Internet), using any suitable communication protocol.

Moreover, when an action is said to be performed by a terminal, it is in fact executed by a microprocessor in this terminal controlled by instruction codes recorded in a program memory on said terminal. An action is also ascribed to an application or software. This means that part of the instruction codes making up the application or software are executed by the microprocessor.

Figure 2:
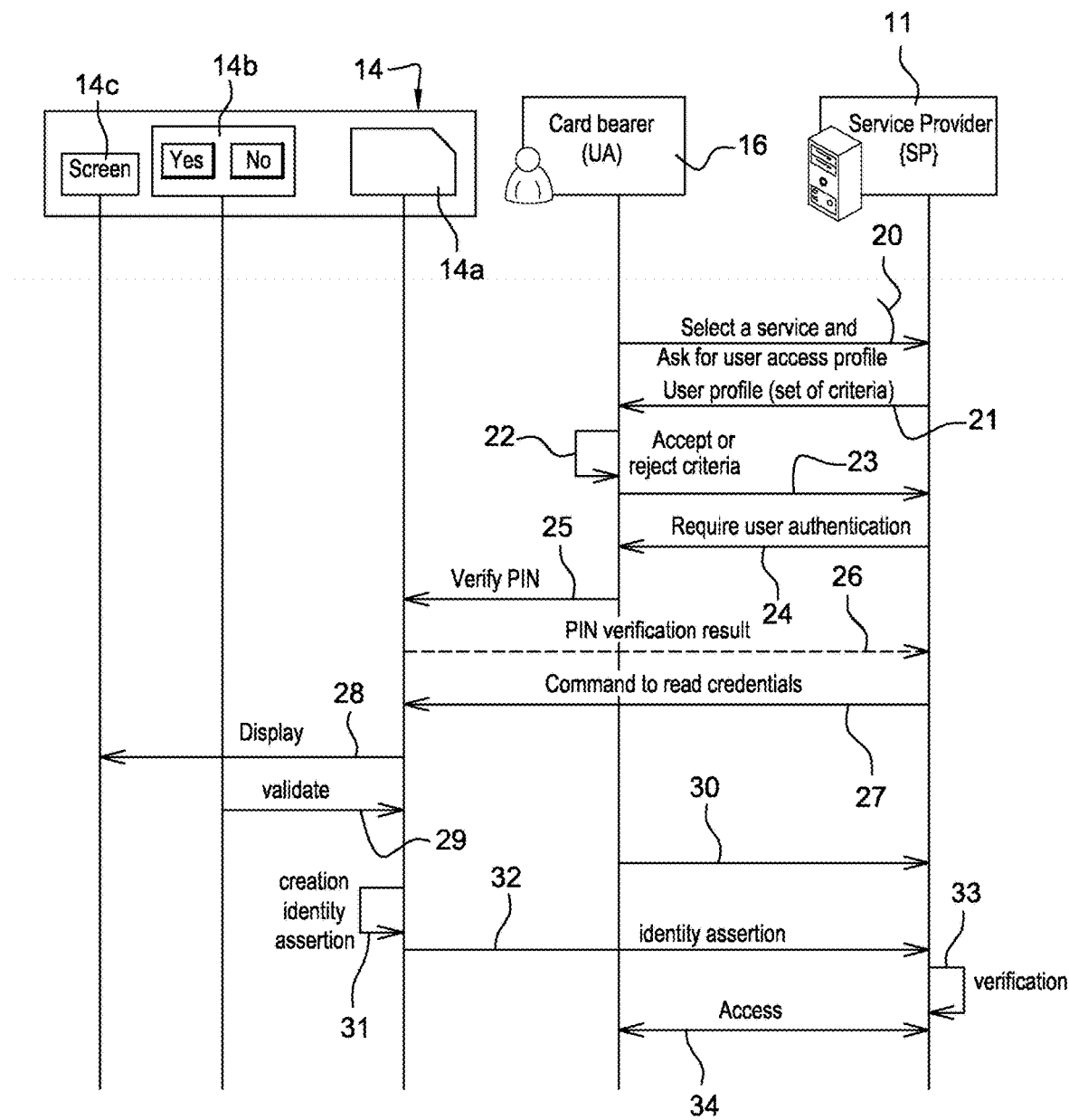
FIG. 2 shows a schematic illustration of a process flow of an exemplary embodiment of the invention.

FIG. 1 is a block diagram illustrating the participants in the processes described in FIG. 2 according to an embodiment of the present invention. In this embodiment is illustrated a proving party 16 who is a user that wants to perform a transaction, e.g. to access to a service of a service provider 11. The proving party 16 executes a client application, e.g. a web browser, on a terminal 12.

The terminal 12 is connectable to the service provider via communication lines 13. The communication lines 13 are usually provided through a network, e.g. the Internet. Specifically, the service provider 11 is realized by a server and a database that are managed by the provider.

The service provider is an entity that provides Web Services. Examples of Service Providers include Application Service Providers (ASP), Storage Service Providers (SSP), and Internet Service Providers (ISP).

The proving client 16 holds a security token device. The security token devices, sometimes called identity tokens, authentication tokens, are the device for authenticating and authorizing a user's identity or "digital identity." The security token device is connected to the terminal 12 via an interface device not shown.

The security token device can be any physical token comprising a display such as a USB token with appropriate memory for storing user sensitive data.

In the embodiment illustrated herein, the security token is an identity card 14. In the embodiment illustrated herein, the identity card 14 is a display Electronic Identity Card ("eID" or "EIC"). In the embodiment illustrated herein, the identity card 14 is connected to the terminal 12 via a card reader not shown.

The identity card 14 comprises means to store information about the identities of said proving client. These means are generally a secure element. Identity card 14 takes care of identity related interaction with the service provider 11 and the user 16. The identity card 14 may comprise means to maintain and manage identity information for users. The identity card 14 stores identity-related information (IRI). Under the term identity-related information IRI is understood any information or attributes related to a person or user. Identity-related information IRI may comprise attributes like names, addresses, group memberships, authorization credentials, demographic data, personal preferences, calendar entries, medical, financial information, and everything else that may be stored digitally about a person or under a user name. The proving party 16 may desire such IRI for access control, authorization, personalization, authentication, login, commercial, medical, governmental or other issues.

The identity card comprises a display device comprising circuits such as a secure element 14a, a memory, and a user interface. The identity card 14 interfaces with the user interface for user interaction (e.g., to enter and view information). The user interface comprises control keys 14b and a display screen 14c provided onto the surface of the display identity card 14. The secure element 14a is used by the identity card 14 to host and store data and applications that require a high degree of security. The secure element 14a can store identity-related information about the card holder, signature keys and certificates.

As used herein, the term "terminal" encompasses, for example, desktop computers, laptop computers and mobile devices and other processor-equipped devices that may be developed in the future that may be configured to permit a user to interact with other devices over a network. As used herein, a "mobile device" encompasses cellular telephones, personal data assistants (PDA), and smart telephones.

As used herein, a "server" is a computing device that may be configured to interact in an automated fashion with other devices over a network to serve content and web pages, to issue responses to communications from other network devices and to respond to queries from other network devices.

As used herein, the term "service" encompasses multimedia content, software, platform, cloud computing, network, data, security, storage, database, desktop, streaming media and so on. Service is sometimes collectively referred to as a "resource."

FIG. 2 shows a schematic illustration of a process flow of an exemplary embodiment of the invention. Therein, the process flow between the proving party 16, the identity card 14 and the service provider 11 is depicted with labeled arrows to which respective numbers are assigned. The flow is understood as being performed sequentially from top to bottom as indicated by the increasing numbers. However, it should be noted that there may be multiple instances of this protocol run in parallel without specified ordering.

If the proving party 16 wants use or access to a restricted service of the service provider 11, it sends in step 20 a request to acquire a first policy to access to the desired service through the terminal to the service provider. At step 21, the service provider 11 sends the first policy access back to the proving party terminal. In this example we assume that the policy for the requested service requires a proof of the user to be older than 21.

As used herein, the term "policy" encompasses requirements and criteria which determine if a user has been given permissions to access to a protected service.

At step 22, the proving party 16 can select an agreement icon displayed on the terminal to accept the criteria of the received first policy by clicking on it. By clicking on the agreement icon the proving party gives its approval to the service provider to receive or read, from its card, the statements corresponding to the criteria of the first policy access. If the proving party clicks on a rejection icon, then the process flow will close. At step 23, the terminal may send a message to inform the service provider of the selected icon.

If the agreement icon is selected, the service provider 11 may require, at step 24, an authentication of the proving party 16. The authentication step may use a username/password or multifactor authentication. Typically, the proving party 16 is prompted, at step 25, to enter a confidential PIN, preferably through the identity card 14 interface or though the terminal interface. Upon receiving the PIN, the identity card 14 looks up the stored PIN and compares the looked-up PIN with the received PIN. When the number entered matches with the number stored in the identity card 16, a PIN verification issue may be elaborated and sent to the service provider 11, at step 26.

The authentication steps 24 to 26 can be performed after that the proving party requests, at step 20, to access to a service. In an embodiment, the flow can be implemented without those authentication steps.

At step 27, the service provider 11 sends a request to the identity card 14 of the proving party through the terminal 12 to create an identity assertion with statements about attributes of the proving party 16. This statement is a kind of pseudo-certificate bearing on a unique user attribute. This request comprises a second policy access and a command to read or receive the identity assertion.

In an embodiment, at step 28, before creating this identity assertion, the identity card 14 compares the received second policy to the first policy received by the terminal. If they are identical then the content of the policy access has not been altered and the identity assertion derivation step is performed.

In another embodiment, the identity card 14 displays to the screen 14c the received second policy access. At step 29, the proving party 16 compares the displayed second policy access on the display screen 14c to the first policy access displayed on the terminal and accepted at step 22. If they are identical then the content of the policy access has not been altered and the user approves the creation of the identity assertion by for example clicking on an approval button.

Instead, if the second policy access is not similar to the first one accepted at step 22, then the identity card 14 or the proving party can reject the transaction by for example clicking on the corresponding button and the transaction process flow will be closed. At step 30, the proving party through the terminal may sent a message to inform the service provider of the selected button.

At step 31, the identity card 14 performs the derivation of the identity assertion. This identity assertion is deduced from the stored identity-related information (IRI) and the received policy. This identity assertion allows to the proving party 16 to prove to the service provider 11, while staying completely anonymous and unlinkable, that he fulfills the received policy. This identity assertion can be derived from the birth date attribute of the user. In this example, the identity assertion comprises the statements that the proving party 16 is older than 21. This created identity assertion is sent to the service provider at step 32. In another embodiment, at step 32, the service provider can read from the identity card 14 through the terminal the generated identity assertion.

In a second embodiment, the identity card 14 displays the derivated identity assertion at step 31 onto the display screen 14c. The proving party 16 compares the displayed statements of the identity assertion to the requirements of the first policy access accepted at step 22. If they correspond then the content of the second policy access has not been altered and the user can approve the transmission or reading at step 32 of the identity assertion by for example clicking on the approval button. This embodiment allows user to make a double check on the request and the response back to the service provider.

In the embodiment illustrated in FIG. 2, the identity assertion is created by the identity card 14, before delivering it to the service provider. The creation of the identity assertion can be performed by a third party such as an identity provider. In this case the IRI can be stored by the third party.

At step 33, the service provider makes an access control decision—in other words it verifies if the identity assertion matches the requirement to access to the service requested. If the requirement is fulfilled then the service provider, at step 34, grants an access to the requested service for the connected proving party 16.

Today, it is known several standards for exchanging authentication and authorization data to obtain this identity assertion, in particular, between an identity provider, a service provider and a principal (user). These standards define method to create and provide the identity assertion to the service provider. Those standards are well known by the person in the art and do not need to be described anymore herein. Whatever, the standard implemented the creation and/or the transmission of the identity assertion is subject to a visual control of the user.

The invention claimed is:

1. A method for creating an identity assertion of a proving party by a security token device comprising:
   the proving party requesting an access to a restricted service of a service provider through a terminal connected to the service provider,
   said service provider sending to the security token device through the terminal a first policy to access the restricted service, a request to create the identity assertion with statements about attributes of the proving party matching the first policy,
   when the service provider receives a validation of the first policy by the proving party through the terminal, said service provider sends then to the security token device of the proving party a second policy,
   upon receiving the second policy, verifying that the first policy and the second policy are similar,
   upon successful verification that the first policy received through the terminal and the second policy received through the security token device are similar, deriving the identity assertion from identity-related information of the proving party and said first or second received policy, and transmitting the derived identity assertion to the service provider, to access the restricted service.

2. The method according to claim 1, wherein after the identity assertion is derived,
   displaying the identity assertion to a screen of the security token device,
   when the statements of the identity assertion are approved by the proving party from a keyboard of the security token, transmitting the identity assertion to the service provider or allowing the service provider to read the identity assertion from the security token device.

3. The method according to claim 2, wherein deriving the identity assertion is performed by a third party storing user information.

4. The method according to claim 1, wherein deriving the identity assertion comprises delegating a creation of the identity assertion by a third party storing user information.

5. The method according to claim 4, wherein the third party is an identity provider.

6. The method according to claim 1, wherein the service provider grants an access to the requested service for the connected proving party if the received identity assertion matches the requirement to access said service.

7. The method according to claim 1, wherein before the derivation step of the identity assertion, an authentication of the proving party is performed by the security token device.

8. The method according to claim 1, wherein the security token device is a display device comprising circuits such as a secure element, control keys and a display screen provided onto the surface of the device.

9. The method according to claim 1, wherein the security token device is a display Electronic Identity Card or a display USB token.

10. The method according to claim 1, wherein the service provider is an Application Service Providers (ASP), a Storage Service Providers (SSP), or an Internet Service Providers (ISP).

11. The method according to claim 1, wherein the service provider and the proving party terminal are connected via a secured communication channel.

12. The method for creating an identity assertion of a proving party according to claim 1, further comprising:
the security token device deriving the identity assertion from user information stored into the security token device and the first policy,
transmitting the identity assertion to the service provider from the security token device through the terminal or allowing the service provider to read the identity assertion from the security token device via the terminal.

13. The method for creating an identity assertion of a proving party according to claim 1, wherein the derived identity assertion is transmitted to the service provider from the security token device through the terminal or the service provider is allowed to read it from the security token device via the terminal.

14. The method of claim 1 wherein the security token device verifies that the first policy and the second policy are similar, and wherein the security token device derives the identity assertion.

15. The method of claim 1 wherein verifying that the first policy and the second policy are similar comprises:
operating the security token device to display the received second policy thereby allowing the proving party to compare the first policy and the second policy; and
receiving an indication from the proving party an approval for creating the identity assertion.

16. A system for creating an identity assertion, comprising a proving party terminal configured to communicate with a service provider to access a restricted service, wherein the derivation of the identity assertion is performed by a security token device of the proving party by
the proving party requesting an access to a restricted service of the service provider through a terminal connected to the service provider,
said service provider sending to the security token device through the terminal: a first policy to access the restricted service, a request to create the identity assertion with statements about attributes of the proving party matching the first policy,
when the service provider receives a validation of the first policy by the proving party through the terminal, said service provider sends then to the security token device of the proving party a second policy,
upon receiving the second policy, verifying that the first policy and the second policy are similar,
upon successful verification that the first policy received through the terminal and the second policy received through the security token device are similar:
deriving the identity assertion from identity-related information of the proving party and said first or second received policy, and
transmitting the derived identity assertion to the service provider, to access the restricted service.

17. The system according to claim 16, wherein after the identity assertion is derived,
displaying the identity assertion on a screen of the security token device,
when the statements of the identity assertion are approved by the proving party from a keyboard of the security token, transmitting the identity assertion to the service provider or allowing the service provider to read the identity assertion from the security token device.

18. The system according to claim 16, wherein deriving of the identity assertion is performed by a third party storing user information.

19. The system according to claim 16, wherein the service provider grants an access to the requested service for the connected proving party if the received identity assertion matches the requirement to access said service.

20. The system according to claim 16, wherein before deriving the identity assertion, an authentication of the proving party is performed by the security token device.

21. The system according to claim 16, further comprising:
the security token device deriving the identity assertion from user information stored into the security token device and the first policy,
transmitting the identity assertion to the service provider from the security token device through the terminal or allowing the service provider to read the identity assertion from the security token device via the terminal.

22. The system according to claim 16, wherein the derived identity assertion is transmitted to the service provider from the security token device through the terminal or the service provider is allowed to read it from the security token device via the terminal.

23. The system of claim 16 wherein the security token device verifies that the first policy and the second policy are similar, and wherein the security token device derives the identity assertion.

24. The system of claim 16 wherein the security token device verifies that the first policy and the second policy are similar by:
displaying the received second policy thereby allowing the proving party to compare the first policy and the second policy; and
receiving an indication from the proving party an approval for creating the identity assertion.

* * * * *